(12) United States Patent
Rusert et al.

(10) Patent No.: US 8,953,511 B2
(45) Date of Patent: Feb. 10, 2015

(54) FAST CHANNEL SWITCHING IN TV BROADCAST SYSTEMS

(75) Inventors: Thomas Rusert, Kista (SE); Markus Kampmann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1068 days.

(21) Appl. No.: 13/001,771

(22) PCT Filed: Jul. 3, 2008

(86) PCT No.: PCT/EP2008/005463
§ 371 (c)(1),
(2), (4) Date: Jan. 10, 2011

(87) PCT Pub. No.: WO2010/000288
PCT Pub. Date: Jan. 7, 2010

(65) Prior Publication Data
US 2011/0096713 A1    Apr. 28, 2011

(51) Int. Cl.
*H04H 20/71* (2008.01)
*H04N 21/44* (2011.01)
*H04N 21/234* (2011.01)
*H04N 21/2343* (2011.01)
*H04N 21/414* (2011.01)
*H04N 21/434* (2011.01)
(Continued)

(52) U.S. Cl.
CPC ... *H04N 21/44016* (2013.01); *H04N 21/23424* (2013.01); *H04N 21/2343* (2013.01); *H04N 21/41407* (2013.01); *H04N 21/4348* (2013.01); *H04N 21/4384* (2013.01); *H04N 21/6405* (2013.01)
USPC ............... 370/312; 370/252; 375/240.13

(58) Field of Classification Search
None
See application file for complete search history.

(56) References Cited

U.S. PATENT DOCUMENTS

| 7,552,227 B2 | 6/2009 | Wang |
| 2004/0181813 A1* | 9/2004 | Ota et al. ............ 725/131 |
| 2007/0073779 A1* | 3/2007 | Walker et al. ............ 707/104.1 |

(Continued)

FOREIGN PATENT DOCUMENTS

| JP | 2006527927 A | 12/2006 |
| WO | 2006016950 A1 | 2/2006 |

OTHER PUBLICATIONS

Ip, T.-P. et al. "Adopting SP/SI-Frames in Dual-Bitstream Video Streaming with VCR Support." 2006 IEEE International Conference on Acoustics, Speech and Signal Processing, Toulouse, France, May 14-19, 2006.

(Continued)

*Primary Examiner* — Mohammad Adhami
(74) *Attorney, Agent, or Firm* — Coats & Bennett, PLLC

(57) ABSTRACT

The invention relates to a technique for supporting a fast channel switching in broadcast systems or similar systems for the distribution of media data, for example mobile TV data, in a point-to-multipoint ('PTM') fashion. A method embodiment of the technique for supporting a fast channel switching in a system (100) comprising multiple PTM primary channels is performed in a transmitter (102) and comprises the steps of transmitting pictures (P) on each of the multiple PTM primary channels; and transmitting channel switching information ('CSI') items on a secondary channel for supporting a fast channel switching, wherein each CSI item allows a determination of an intra-coded picture of one of a pair of primary channels at a receiver side based on a picture of the other of the pair of primary channels.

20 Claims, 8 Drawing Sheets

(51) Int. Cl.
*H04N 21/438* (2011.01)
*H04N 21/6405* (2011.01)

(56) References Cited

U.S. PATENT DOCUMENTS

2008/0022352 A1* 1/2008 Seo et al. ................ 725/142
2010/0036964 A1* 2/2010 Cedervall et al. ............ 709/231

OTHER PUBLICATIONS

Karczewicz, M. et al. "Adopting SP/SI-Frames in Dual-Bitstream Video Streaming with VCR Support." IEEE Transactions on Circuits and Systems for Video Technology, vol. 13, No. 7, Jul. 2003.
Boyce, J., et al., "Fast Efficient Channel Change", 2005 ICCE, Jan. 2005, pp. 1-2.

* cited by examiner

FAST CHANNEL SWITCHING IN TV BROADCAST SYSTEMS

TECHNICAL FIELD

The invention relates to techniques for supporting a fast channel switching in broadcast systems, multicast systems or similar systems for the distribution of media data, for example mobile TV data, in a point-to-multipoint fashion.

BACKGROUND

Various point-to-multipoint (PTM) distribution systems for multimedia data exist today. For instance, TV channels may be delivered via the Internet (IPTV) or in a mobile environment (Mobile TV) using digital multicast or broadcast techniques. Current standards for Mobile TV are for example the Digital Video Broadcast-Handhelds (DVB-H) framework or the Multimedia Broadcast/Multicast Service (MBMS) feature of the 3$^{rd}$ Generation Partnership Project (3GPP).

In such systems, media data such as mobile TV data are represented as a stream of pictures, each picture comprising frame (an image captured at some instance in time) information or at least some field information (any information that may contribute to an image at some time instance). Normally on a TV channel a compressed video stream is transmitted that is encoded using so-called predictive coding techniques. An intra-coded picture (I-picture) allows instantaneous decoding, because the picture is coded without reference to any other picture. Such I-pictures are typically generated by an encoder to create a point in time at which a decoder can start a proper decoding. In contrast to I-pictures, predictively-coded pictures (P-pictures) are encoded such that further information from previous pictures is required in order to entirely decode the P-frame to an image. A P-picture may contain image data, motion vector displacements and/or combinations of such data. P-pictures may be encoded using a previously encoded I-picture and/or P-picture(s) as references. Bidirectional predictively-coded frames or pictures (B-pictures) may additionally or alternatively include information related to future pictures. The distance between two consecutive I-pictures in the stream is denoted as the GOP (Group Of Pictures)-size. As I-pictures are more costly in terms of bit rate than P-pictures, in order for a high compression ratio it is advantageous to have a large GOP size, i.e. a high number of P- (or B-)pictures in the stream. As a decoder in a TV receiver has to wait for an I-picture to start decoding, a low frequency of I-pictures in the stream means that after a channel switching request of a user a considerable delay may occur until the receiver has tuned to the required new channel and starts the play-out.

Techniques for reducing this channel switching delay are generally referred to as 'fast channel switching' techniques. For fast channel switching, in addition to the "primary channels" for transmitting the actual TV streams, a further "secondary channel" may be provided for the transmission of supplemental I-pictures for each of the primary channels with which the secondary channel is associated. For example, in a mobile TV system as provided over a mobile network, a single secondary channel may be provided for 4-5 primary channels.

In order to limit the additional bandwidth requirements associated with the additional secondary channel, typically the supplemental I-pictures are of lower quality as compared to I-pictures in the primary channels. Thus, the video quality after tune-in is momentarily decreased until reception of the first I-picture of the tuned primary channel. The stream of supplemental I-pictures in the secondary channel may also have a reduced picture rate compared to the corresponding primary channel(s), i.e. not every P-picture in the primary channel has a corresponding supplemental I-picture in the secondary channel. However, even with a reduced frame rate, the channel switching delay can be considerably reduced. For example, a picture rate equal to 1 picture per GOP size in the primary channel may reduce the delay on average by half.

SUMMARY

Even in case lower quality pictures are transmitted on the secondary channel at a reduced picture rate, the provision of the supplemental I-pictures in the secondary channel increases the bandwidth requirements for the system. There is a demand for a technique for supporting a fast channel switching in a system comprising multiple PTM primary channels which allows to reduce the bandwidth requirements for the transmission of media data compared to the conventional approach described above.

This demand is satisfied by a method for supporting a fast channel switching in a system comprising multiple point-to-multipoint ("PTM") primary channels. The method is performed on a transmitter side and comprises the steps of transmitting pictures on each of the multiple PTM primary channels; and transmitting channel switching information ("CSI") items on a secondary channel for supporting a fast channel switching, wherein each CSI item allows a determination of an intra-coded picture of one of a pair of primary channels at a receiver side based on a picture of the other of the pair of primary channels.

The PTM system may, as an example, comprise a mobile network implementing a broadcast service platform for mobile TV. For instance, the broadcast may be performed using the 3GPP MBMS feature. The pictures transmitted on the primary channels may comprise intra-coded pictures (I-pictures) and predictively coded pictures (P-pictures). The GOP size may be the same for all or a subset of the primary channels, or each primary channel may have its individual GOP size. The time instance at which an I-picture is transmitted may be the same for all or a subset of the primary channels, or each primary channel may transmit I-pictures at individual time instants.

The step of transmitting the CSI items may comprise determining I-pictures from one or more of the P-pictures transmitted on the primary channels. For example, an I-picture may be coded from one P-picture to be transmitted on a particular primary channel at a particular time instance. Alternatively, the encoding of the I-picture may also include information from previous P-pictures on the particular primary channel.

In one implementation, each CSI item represents the result of applying an XOR operation to an I-picture of the one of the pair of primary channels and an I-picture of the other of the pair of primary channels. In other implementations, the CSI items may represent the result of less complex operations. While a CSI item may have the same size as a picture, e.g. an I-picture, of the primary channels (or a reduced size as to a reduced image quality provided by the secondary channel), in other implementations the CSI item may have a size larger than the primary channel pictures in order to reduce an operation complexity on a receiving side.

According to one mode, N−1 CSI items are transmitted in parallel on the secondary channel for a number N of primary channels.

The CSI items may be transmitted so that at most two CSI items are required for a determination of an intra-coded picture of a primary channel to be switched to at the receiver side. In one variant of this, all CSI items are generated using an I-picture of one and the same primary channel. For example, referring to four primary channels A, B, C and D, then each CSI item may be formed from an operation involving a picture of channel A and one further channel, such that CSI items C_AB, C_AC, C_AD are formed.

According to one implementation, CSI items are transmitted in the secondary channel with at least one of an item transmission rate which is lower than a picture transmission rate in the primary channels and an item data size which is smaller than an intra-coded picture data size in the primary channels.

The above-mentioned demand is also satisfied by a further method for supporting a fast channel switching in a system comprising multiple point-to-multipoint ("PTM") primary channels. This method is performed on a receiver side and comprises the steps of receiving pictures on a first primary channel of the multiple PTM primary channels and channel switching information ("CSI") items on a secondary channel, wherein each CSI item allows a determination of an intra-coded picture of one of a pair of primary channels at a receiver side based on a picture of the other of the pair of primary channels; and determining, in response to a request to switch from the first primary channel to a second primary channel of the multiple PTM primary channels, an intra-coded picture of the second primary channel based on a picture of the first primary channel and one or more of the CSI items.

The received pictures may comprise predictively coded pictures (P-pictures). The step of determining the intra-coded picture (I-picture) of the second primary channel may then comprise determining an I-picture from a received P-picture of the first primary channel. In another mode, an I-picture may be received from the first primary channel, which can be used for determining the I-picture of the second primary channel and the one or more CSI items. In this case the determination of an I-picture from a P-picture of the first primary channel can be omitted.

The intra-coded picture of the second primary channel may be generated by performing one or more XOR operations on the intra-coded picture of the first primary channel and one or more of the received CSI items. Alternatively, other operations may be performed.

In one implementation of one or both the methods outlined above, the system with multiple PTM primary channels and the secondary channel is a (mobile) TV broadcast system and the pictures of the primary channels represent TV data.

Further, the abovementioned demand is satisfied by a computer program product, which comprises program code portions for performing the steps of any one of the methods and method aspects described herein when the computer program product is executed on one or more computing devices, for example a transmitter device, receiver device, or any device associated therewith. The computer program product may be stored on a computer readable recording medium, such as a permanent or re-writeable memory within or associated with the computing device or a removable CD-ROM, DVD or USB-stick. Additionally or alternatively, the computer program product may be provided for download to the computing device, for example via a data network such as the Internet or a communication line such as a telephone line or wireless link.

The above-mentioned demand is still further satisfied by transmitter device adapted to support a fast channel switching in a system comprising multiple point-to-multipoint ("PTM") primary channels. The transmitter device comprises a first component adapted to transmit pictures on each of the multiple PTM primary channels; and a second component adapted to transmit channel switching information ("CSI") items on a secondary channel for supporting a fast channel switching, wherein each CSI item allows a determination of an intra-coded picture of one of a pair of primary channels at a receiver side based on a picture of the other of the pair of primary channels. The second component may be adapted to transmit, for a number N of primary channels, N−1 CSI items in parallel on the secondary channel.

The above-mentioned demand is still further satisfied by a receiver device adapted for a fast channel switching in a system comprising multiple point-to-multipoint ("PTM") primary channels. The receiver device comprises a first component adapted to receive pictures on a first primary channel of the multiple PTM primary channels and channel switching information ("CSI") items on a secondary channel, wherein each CSI item allows a determination of an intra-coded picture of one of a pair of primary channels at a receiver side based on a picture of the other of the pair of primary channels; and a second component adapted to determine, in response to a request to switch from the first primary channel to a second primary channel of the multiple PTM primary channels, an intra-coded picture of the second primary channel based on a picture of the first primary channel and one or more of the CSI items.

The above-mentioned demand is moreover satisfied by a system comprising a transmitter and a receiver as outlined above. In this system, the transmitter side and the receiver side are adapted to identically perform a determination of intra-coded pictures from the pictures transmitted on the primary channels.

The above-mentioned demand is also satisfied by a channel switching information ("CSI") item provided for transmission on a secondary channel for supporting a fast channel switching in a system comprising multiple point-to-multipoint ("PTM") primary channels, wherein the CSI item allows a determination of an intra-coded picture of one of a pair of primary channels based on a picture of the other of the pair of primary channels.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as broadcast system with a particular channel configuration, in order to provide a thorough understanding of the current invention.

It will be apparent to one skilled in the art that the current invention may be practiced in other embodiments that depart from these specific aspects. For example, the skilled artisan will appreciate that the current invention may be practised in systems different from the mobile TV system described below to illustrate the present invention. This may include any system for point-to-multipoint distributions of data on multiple channels, in which a channel switching delay may occur due to a coding scheme referring to data transmitted at prior (and/or subsequent) time points. This may include not only wireless broadcast/multicast systems based on DVB, MBMS or similar current or future standards, but also wireline systems in an IP or similar network environment.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to the processor, wherein the memory is encoded with one or more programs that perform the methods disclosed herein when executed by the processor.

Figure 1:
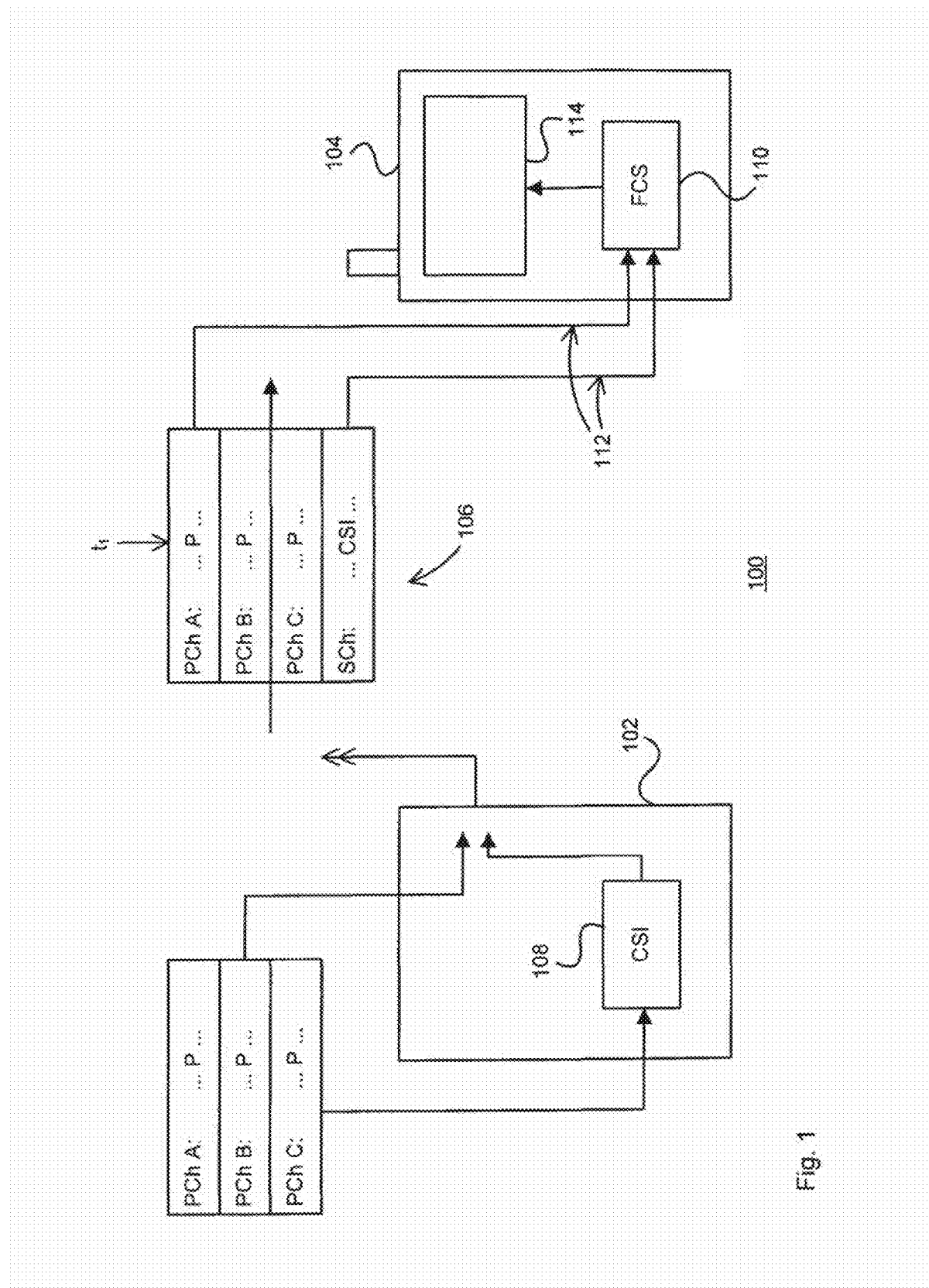
FIG. 1 schematically illustrates an embodiment of a multi-channel broadcast system including a transmitter and a receiver adapted to support a fast channel switching.

FIG. 1 schematically illustrates an embodiment of a system 100 comprising a transmitter 102 and a receiver 104 for the transmission and reception, respectively, of three point-to-multipoint (PTM) primary channels A, B and C. The system 100 is exemplarily assumed to represent an implementation of a Mobile TV system in an UMTS mobile network. While the devices 102 and 104 are illustrated as single devices, the functionality thereof (described hereinbelow) may be implemented on more than one device. For example, the functionality described with reference to the transmitter 102 may be implemented in association with a media server in or connected to the UMTS network. Alternatively, the functionality may be implemented in a control node near to the radio interface 106 of the UMTS network, e.g. in a base station, NodeB or eNodeB. Likewise, the functionality described with reference to the receiver 104 may be implemented, e.g., in a mobile terminal adapted for connecting to the UMTS network via radio interface 106, wherein the mobile terminal may be a mobile telephone or a similar mobile device receptive via radio interface 106. For example, in a case in which the receiver 104 is implemented on a notebook with inserted UMTS card, part of the functionality of the receiver 104 may be implemented on the UMTS card and another part may be implemented on the notebook.

In order to support a fast channel switching from any of the primary channels (PCh) A, B or C to any other of these channels in the receiving device 104, the transmitter 102 operates to provide channel switching information (CSI) on a secondary channel (SCh) via the radio interface 106. To this end, the transmitter 102 comprises a CSI component 108 which applies a predetermined operation to pairs of pictures of the primary channels A, B and C at predetermined time instances such as time instance $t_1$ (also referred to as "t_1" hereinafter) illustrated in FIG. 1 (P-pictures are illustrated with "P" and I-pictures are illustrated as "I" in the figures). Each CSI item generated in this way may represent some aspects of each of the two pictures and/or of a combination of both. For example, a CSI item may represent a difference between the two pictures inputted to the operation. The CSI items generated for a particular time instance, e.g. t_1, are then transmitted in the secondary channel parallel to the pictures of the primary channels for this time instance.

The arrows 112 illustrate in FIG. 1 that at a particular point in time the receiving device 104 is tuned to one primary channel, namely the primary channel A, and receives in parallel the secondary channel. Once a user requests a channel switch, the receiver tunes into the new primary channel, e.g., channel B, and continues receiving the secondary channel. The presentation of the new primary channel to the user starts with the next available I-picture on the new primary channel or, according to the fast channel switching technique described here, an I-picture is derived using the channel switching information from the secondary channel. To this end the receiving device 104 comprises a Fast Channel Switching (FCS) component 110, which operates to enable a fast channel switching by deriving an I-picture from pictures received on channel A and from the channel switching information on the secondary channel. The so-derived I-picture is then presented on a display 114 associated with receiver 104. Further I-pictures related to the new primary channel may be derived in this way until the first I-picture is received directly on the new channel.

In one embodiment, the most recently received pictures on channel A and the CSI items received on the secondary channel may be continuously stored in the receiving device 104 (not shown in the figures), e.g. in a circular buffer. In this configuration, in response to a user's channel switching request immediately an I-picture of channel B may be decoded and presented to the user from a suitable buffered CSI item and corresponding buffered picture(s) on channel A. Subsequently, P-pictures on channel B can be decoded and displayed.

In other embodiments, in which for example no buffer is used in the receiving device, the receiving device may start receiving the secondary channel only when a channel switching request is detected. In this configuration, the receiving device may continue receiving channel A as long as a suitable CSI item is received on the secondary channel. At that time, an I-picture for channel B is decoded from the suitable CSI item and the corresponding picture(s) on channel A. Subsequently, the receiving device tunes to primary channel B. This solution may require less buffer space in the receiving device.

Figure 2:
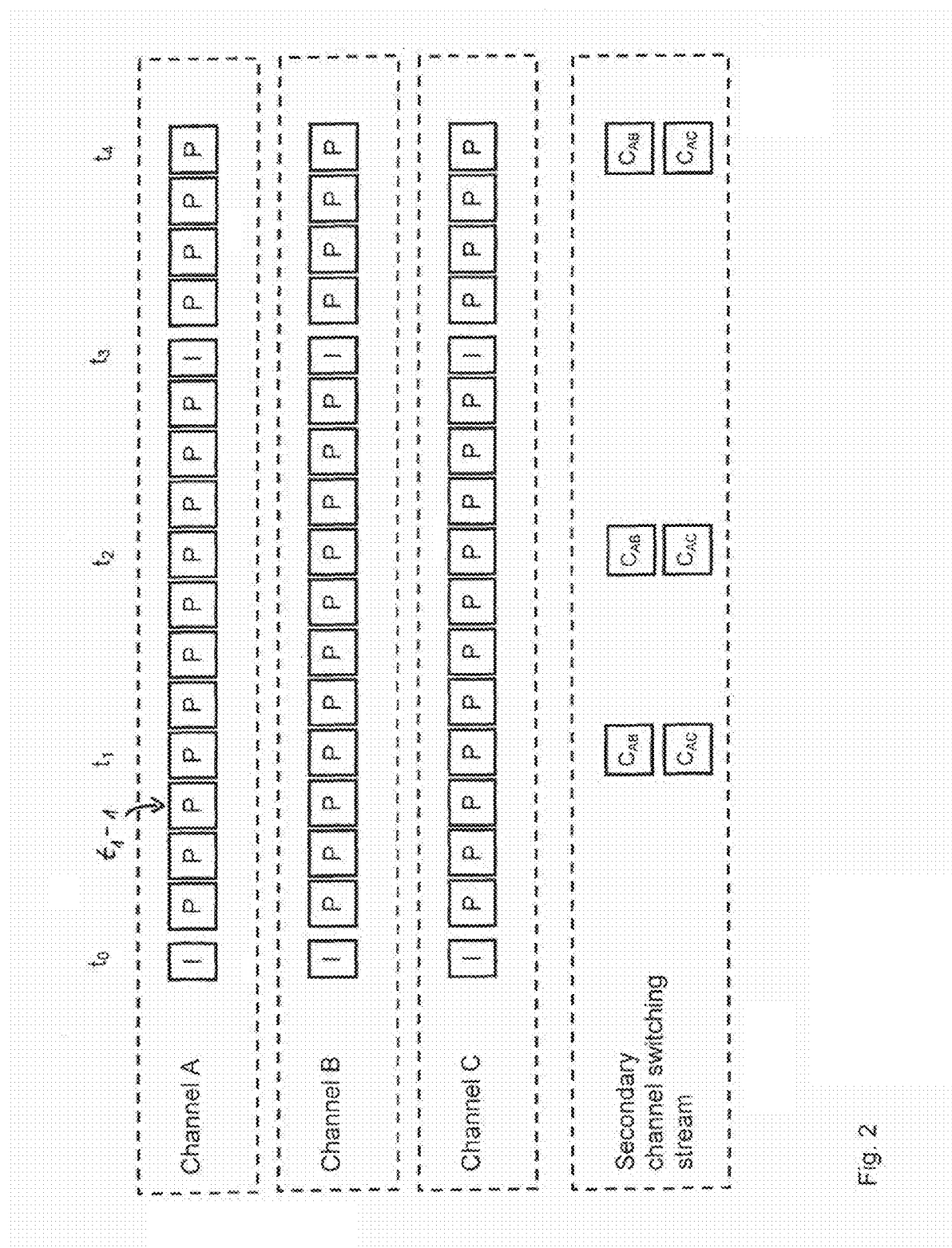
FIG. 2 schematically illustrates a transmission scheme of pictures and CSI information on the multiple primary channels and the secondary channel in the system of FIG. 1.

FIG. 2 illustrates in more detail the channel configuration over the radio interface 106 of FIG. 1. For each of the primary channels A, B and C, a sequence of I- and P-pictures is transmitted. For the sake of illustration, it is assumed that I-pictures are transmitted at the same time instances on the primary channels A, B and C, namely at $t_0$ and $t_3$ in FIG. 2. In other embodiments, I-pictures may be transmitted on each primary channel independently, i.e. without any synchronisation between the channels. Moreover, for the sake of illustration it is assumed in FIG. 2 that each of the primary channels A, B and C have the same GOP size of 12 pictures (i.e., 11 P-pictures until the next I-picture is sent). In other embodiments, each of the primary channels may have its individual GOP size.

In order to support a fast channel switching, at particular time instances $t_1$, $t_2$ and $t_4$ different from $t_0$ and $t_3$, channel switching information is transmitted in the secondary channel. Instead of providing at the time instances $t_1$, $t_2$ and $t_4$ one picture for each of the streams on the primary channels A, B and C, only two CSI items $C_{AB}$ and $C_{AC}$ are provided. As will be described below, these two CSI items are sufficient to enable a fast channel switching between any pair of the primary channels A, B and C in a receiver.

Figure 3:
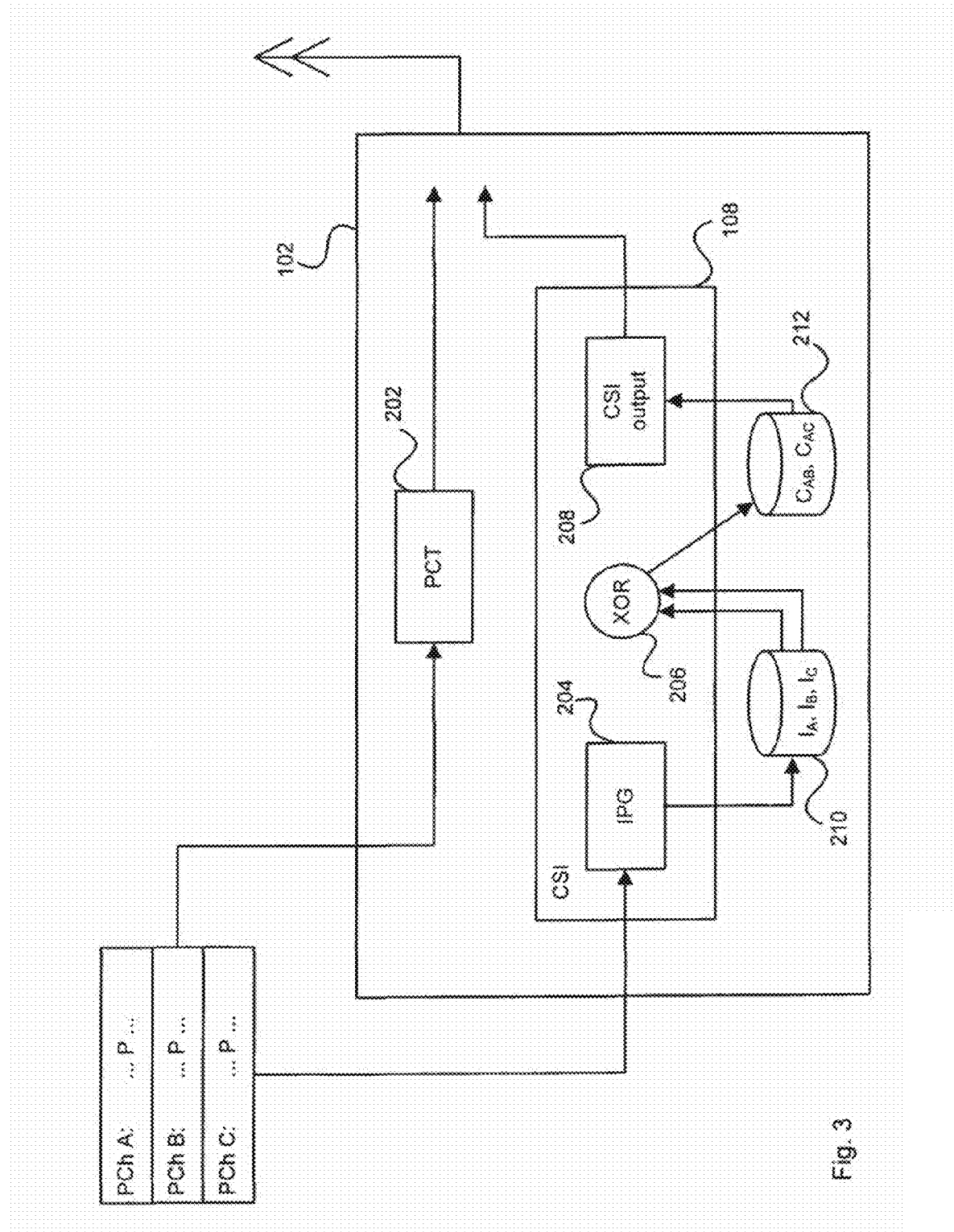
FIG. 3 is a functional block diagram illustrating an embodiment of the transmitter of FIG. 1.

FIG. 3 illustrates in more detail functional components of the transmitter device 102 of FIG. 1. The transmitter device comprises a primary channel transmission (PCT) component 202 and the CSI component 108, which in turn comprises an I-picture generation (IPG) component 204, an XOR component 206 and a CSI output component 208. An operation of the transmitter 102 will be described with reference to the flow diagrams in FIGS. 4a and 4b. Generally, the exemplarily illustrated transmitter 102 operates to provide a TV service comprising multiple TV channels, wherein the TV service provides support for fast channel switching.

Figure 4A:
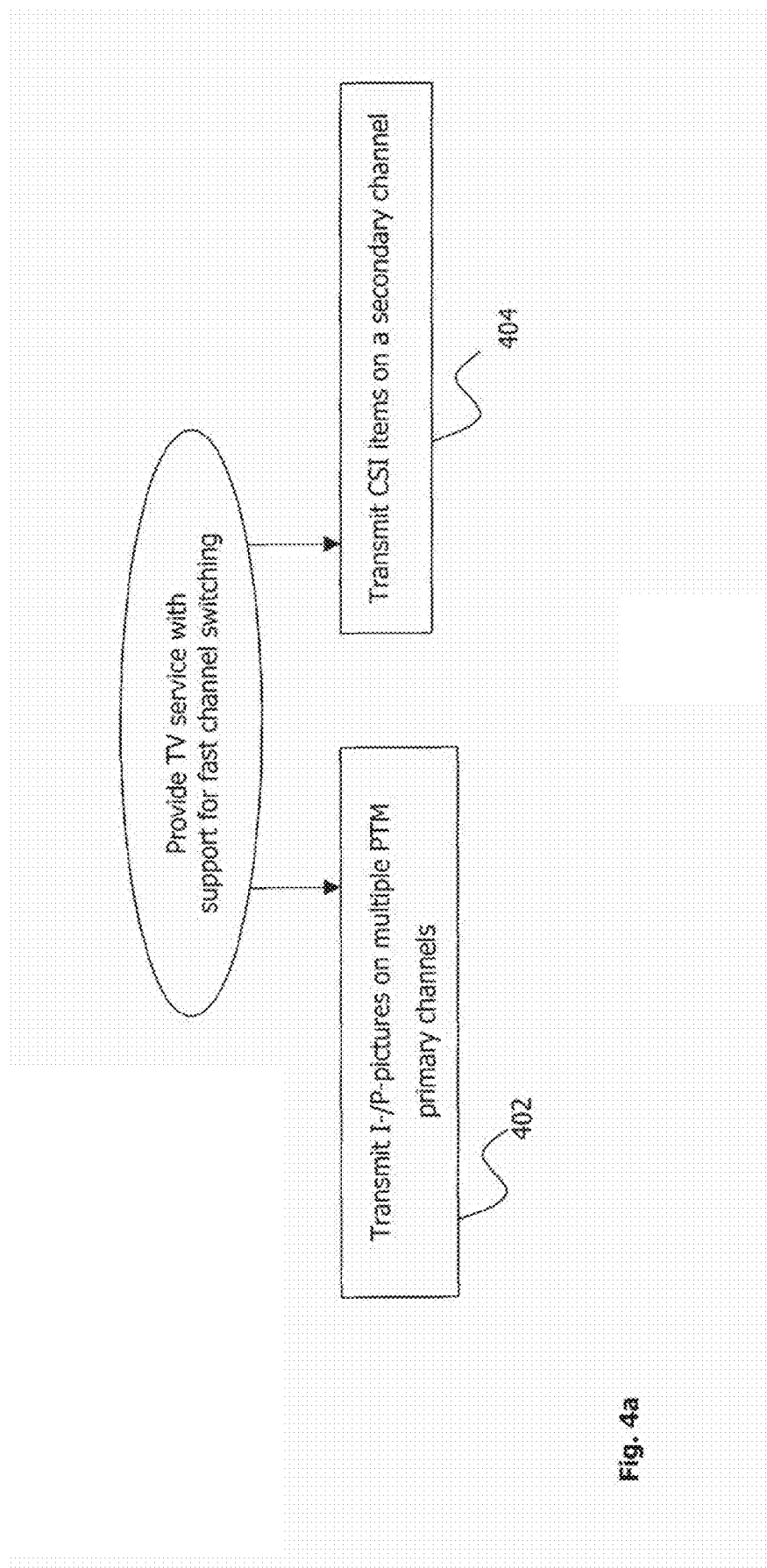
FIGS. 4a, b are flow diagrams illustrating an operation of the transmitter of FIG. 3.
Figure 4B:
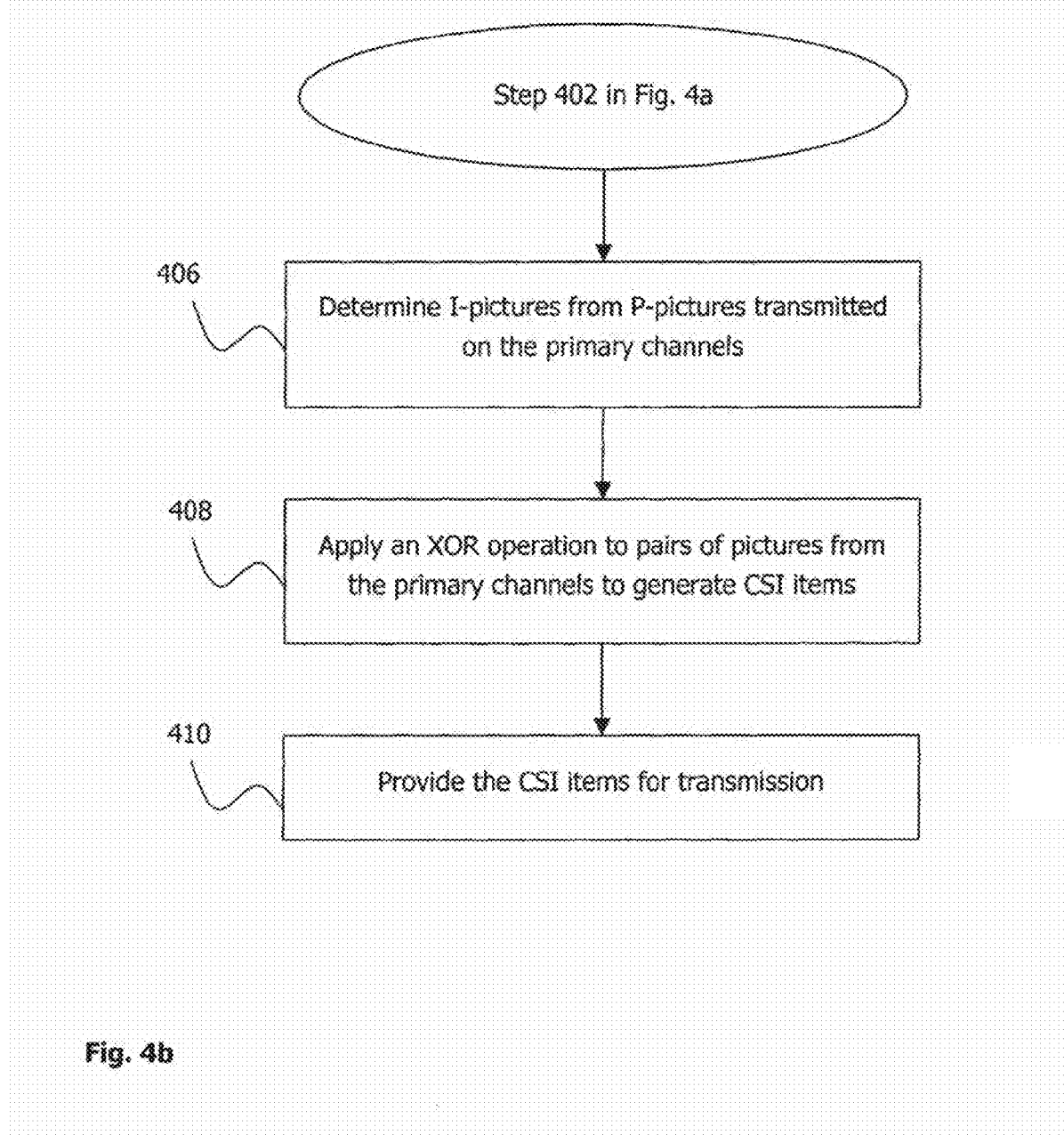

Referring to FIG. 4a, the transmitter 102 performs in parallel the steps 402 and 404. In step 402, the PCT component 202 operates to transmit I-/P-pictures on the primary channels A, B and C. In the parallel step 404, the CSI component 108 operates to transmit CSI items on the secondary channel at particular time instances. Referring exemplarily to the time instance $t_1$ as illustrated in FIG. 2, the component 202 operates to transmit a P-picture for each of the primary channels A, B and C, while the CSI component 108 transmits the CSI items $C_{AB}$ and $C_{AC}$ as illustrated in FIG. 2. The details of how step 404 is performed are further illustrated in FIG. 4b. Firstly, for the time instances at which CSI items are to be transmitted in the secondary channel, an I-picture has to be generated from one or more P-pictures of the corresponding primary channels. Referring for illustrative purposes again to the time instance $t_1$, in step 406, the IPG component 204 operates to determine I-pictures from the P-pictures transmitted at time instance $t_1-1$ in the primary channels. As an example, the component 204 operates to determine an I-picture from the P-picture of channel A scheduled for transmission at time instance $t_1-1$, the two prior P-pictures transmitted on this channel and the I-picture referred to by the P-pictures, namely the I-picture transmitted at time instance $t_0$ (cf. FIG. 2). While in the embodiment described here the reference time instance for the most recent P-pictures which form the basis for the CSI items to be transmitted on $t_1$ is $t_1-1$ (i.e., P-pictures of time instance $t_1-1$ serve as the basis for the transmission of the CSI items at time instance $t_1$), in other embodiments, other reference time instances may be chosen. For example, P-pictures from the time instance $t_1$, or $t_1-2$, $t_1-3$, etc. may be used for determining the CSI items to be transmitted at $t_1$.

The IPG component 204 buffers the determined I-picture for channel A, $I_A$, in a buffer component 210 of the transmitter 102. The IPG component 204 proceeds in a similar way as described for primary channel A with regard to the further primary channels B and C and determines corresponding I-pictures $I_B$ and $I_C$. Also in case at time instance $t_1-1$ an I-picture would have been transmitted in a primary channel, the IPG component would operate to buffer this I-picture in component 210.

The determination of I-pictures $I_A$, $I_B$, $I_C$ is referred to as "re-encoding" hereinafter. For the re-encoding, a well-defined (i.e., bit-exact) algorithm shall be used, in order to enable a proper generation of I-pictures for the fast channel switching in a receiver, as will be described later. Some or all of the I-pictures determined for storage in the buffer 210 may be of a reduced quality compared to the I-pictures transmitted on the primary channels. For example, also in case at time instance $t_1-1$ an I-picture would have been transmitted on the primary channel A, the IPG component 204 may determine a corresponding picture $I_A$ therefrom which is reduced in size and thus in quality.

In step 408, the CSI items $C_{AB}$ and $C_{AC}$ are generated by applying an XOR operation to pairs of the I-pictures which have been buffered in the buffer 210. In particular, the XOR component 206 is adapted to perform the following two operations:

$C_{AB} = I_A$ XOR $I_B$ and $C_{AC} = I_A$ XOR $I_C$. In other words, the XOR component 206 is adapted to generate for a number N=3 of primary channels N−1=2 CSI items. The XOR component 206 is further adapted to use the I-picture $I_A$ related to primary channel A in any of the XOR operations, i.e. the XOR component performs an XOR operation for each combination of $I_A$ with any of the other buffered I-pictures. Instead of always using the I-picture $I_A$ related to primary channel A for each of the CSI items, of course any other primary channel might as well be chosen. In any case, having an I-picture of one and the same primary channel underlying all the CSI items simplifies the fast channel switching procedure in the receiver, as will be described below. The XOR component 206 buffers the CSI items $C_{AB}$ and $C_{AC}$ in a buffer 212.

In step 410, the CSI output component 208 operates to provide the CSI items buffered in buffer 212 at the predetermined time instance $t_1$ for transmission on the secondary channel in parallel with the corresponding (P-) pictures provided by the transmission component 202 for transmission on the primary channels.

As indicated in FIG. 2, the transmission rate of CSI items in the secondary channel is lower than the picture transmission rate in the primary channels. In particular, within a GOP size interval of 12 pictures, the secondary channel offers supplementary CSI items at two time instances. In this way, the bandwidth requirement for the secondary channel is considerably reduced, while the waiting time until a first I-picture can be generated for a channel switched to will on average be considerably reduced by a factor of 3 as compared to a system without support for fast channel switching. In order to further reduce the bandwidth requirement for the secondary channel, the data size of a CSI-item may be made smaller than the typical data sizes of I-pictures transmitted on the primary channels. For example, the IPG component 204 may be adapted in step 402 to generate an I-picture with a reduced data size from the P-picture(s) of the corresponding primary channel; for example, the generated I-picture may have a decreased image resolution and/or reduced colour information than an I-picture in the corresponding primary channel (e.g., the generated I-picture may be no colour picture but may be black and white). Another way of arriving at a reduced data size for the CSI items may comprise to generate the I-pictures underlying the generation of the CSI items with a coarser quantization, i.e. decreased resolution, as compared to the I-pictures transmitted on the primary channels.

Figure 5:
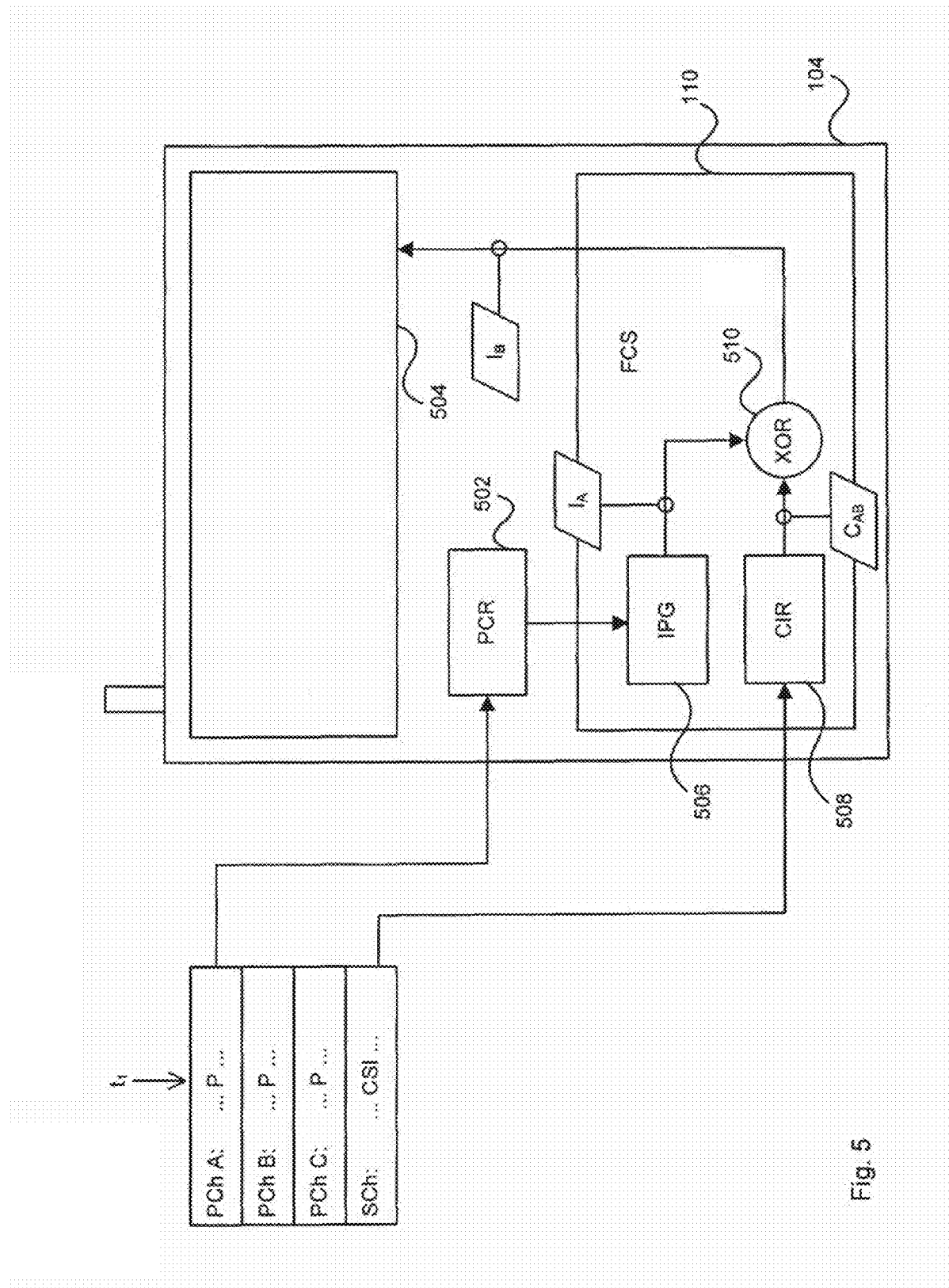
FIG. 5 is a functional block diagram illustrating an embodiment of the receiver of FIG. 1.

FIG. 5 illustrates in more detail functional components of the receiving device 104 of FIG. 1. The receiving device comprises a Primary Channel Reception (PCR) component 502, the Fast Channel Switching (FCS) component 110 and a display 504 for presentation of images from one of the primary channels to a user. The FCS component 110 comprises an I-Picture Generation (IPG) component 506, a CSI Item Reception (CIR) component 508 and an XOR component 510. An operation of the receiver 104 will be described with reference to the flow diagrams in FIGS. 6a and 6b. Generally, the receiver 104 is adapted to perform a fast channel switching from one primary channel to another.

The PCR component 502 is adapted to receive pictures from one of the primary channels. Fur purposes of illustration, it will be assumed that initially primary channel A is received by the PCR component 502, as illustrated in FIG. 5. In case of stationary operation the PCR component 502 provides images resulting from the pictures received on primary channel A to the display 504 for presentation. The CSI items transmitted on the secondary channel may or may not be received in this state. In case a user requests a channel switch, a fast channel switching will be performed. For illustrative purposes, it will be assumed in the following that the user has requested a change from primary channel A to primary channel B at time instance $t_1$.

Figure 6A:
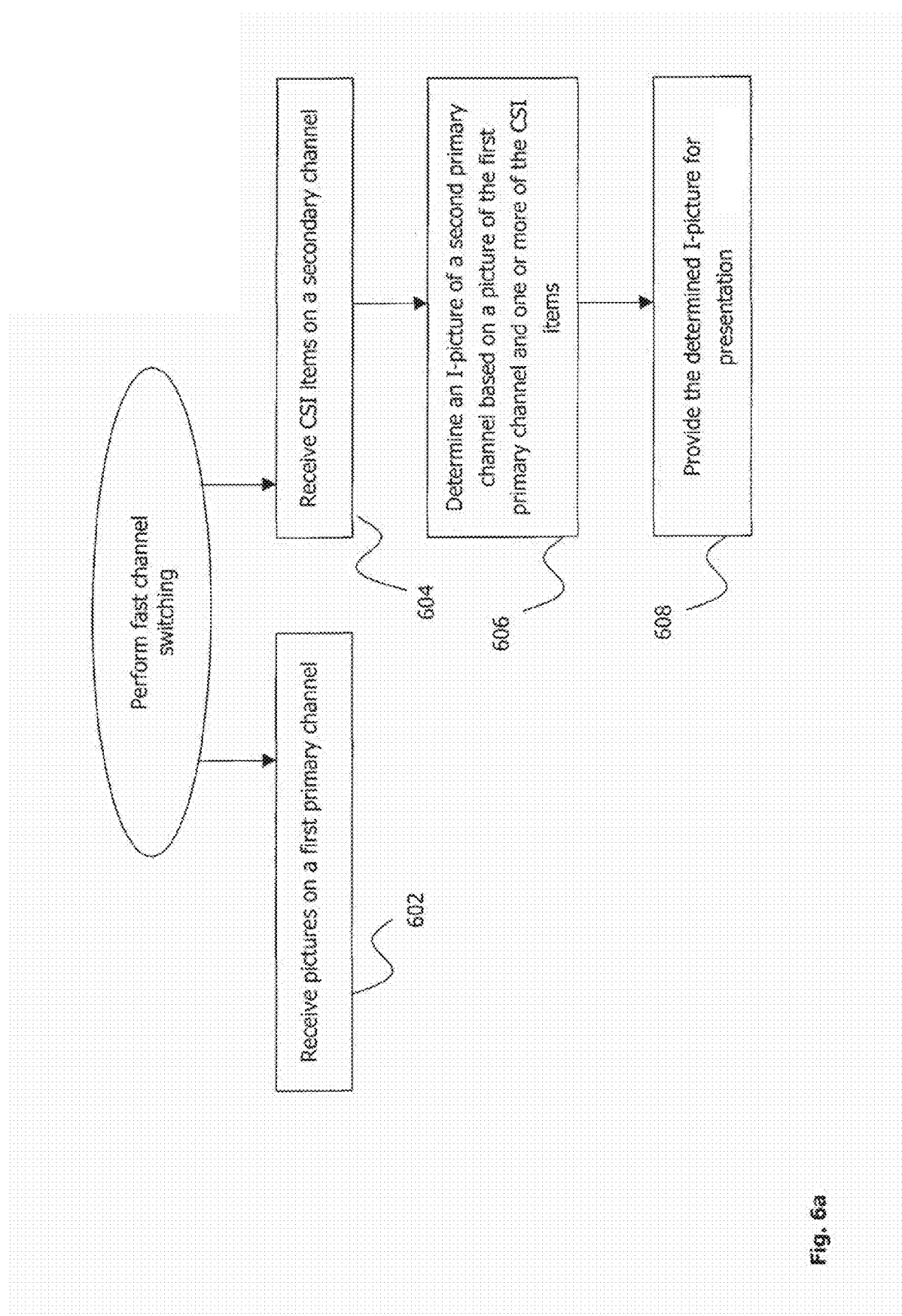
FIGS. 6a, b are flow diagrams illustrating an operation of the receiver of FIG. 5.

Referring to FIG. 6a, in step 602, the PCR component 502 receives primary channel A. More specifically, in case the most recent CSI items and the most recent I-picture of the current primary channel are not buffered at the receiving side, the PCR component 502 may receive channel A until time instance $t_1-1$, and may switch at time instance $t_1$ to primary channel B and will wait for receiving the first I-picture for this channel to start decoding (this first I-picture may in particular be the I-picture recovered from the CSI item transmitted at $t_1$). In other embodiments, in which the most recently received CSI items and I pictures of the currently received primary channel are buffered, the PCR component may switch to the new primary channel B at any time, i.e. immediately when the switching request is received.

In a parallel step 604, the CIR component 508 of the FCS component 110 operates at time instance $t_1$ to receive CSI items on the secondary channel. In particular, the component 508 receives the CSI items $C_{AB}$ and $C_{AC}$ as illustrated in FIG. 2. The component 508 may buffer the received CSI items in a buffer (not shown) and may provide the one or more CSI items required to perform the fast channel switching to the XOR component 510. To this end, the CIR component may receive an appropriate control signal from a control component (not shown) in the receiver 104. In the example discussed here, the CIR component provides the CSI item $C_{AB}$ to the XOR component 510, which is sufficient for the fast channel switching from primary channel A to primary channel B.

In step 606, the FCS component 110 operates to determine an I-picture of the primary channel to switch to, i.e. channel B in the example illustrated in FIG. 5. This is done based on a picture of the first primary channel and one or more of the received CSI items. Having determined the I-picture of channel B, the FCS component 110 presents the I-picture to the screen 504, such that a representation of the ongoing program on channel B is visible to the user, although no I-picture has yet been received in the primary channel B and the PCR component 502 has not started decoding. Depending on whether the I-picture for channel B recovered from the CSI item and the I-picture of channel A has the same resolution as the pictures transmitted on primary channel B, the step 606 may be performed once or may be repeated one or more times until the first I-picture is received in the primary channel to switch to. In case the resolution of the recovered I-picture is lower than that of the pictures transmitted on the corresponding primary channel, the P-pictures transmitted on the primary channel cannot simply be decoded based on this recovered I-picture, and the receiver has to wait for the first full-resolution I-picture transmitted on primary channel B. In this example, the generation and presentation of an I-picture for fast channel switching at time instance $t_1$ may be repeated once, namely at time instance $t_2$ before the first I-picture may be received in channel B at time instance $t_3$ (cf. FIG. 2). This requires that the PCR component 502 stays tuned to the primary channel A and switches to channel B not before time instance $t_2+1$. In case the I-picture for channel B recovered from the CSI item and the I-picture of channel A has the same resolution as I-pictures transmitted on channel B, the recovered I-picture may immediately be used for decoding P-pictures received on primary channel B, i.e. the PCR component may immediately switch to channel B.

The FCS component 110 may be configured to buffer previously received pictures of the primary channel tuned to and CSI information of the secondary channel, e.g. in a circular buffer (not shown in FIG. 5). In this case the FCS component 110 may, in response to a channel switching request, immediately decode an I-picture from the buffered picture(s) of channel A and the buffered CSI information, present the decoded I-picture on the display 504 and may also immediately tune to the new channel B. In a case where no such buffer is available, the FCS component 110 may, after detection of the channel switching request, continue receiving channel A until a CSI item is received on the secondary channel which allows to construct an I-picture for channel B, and may only then tune to channel B.

Figure 6B:
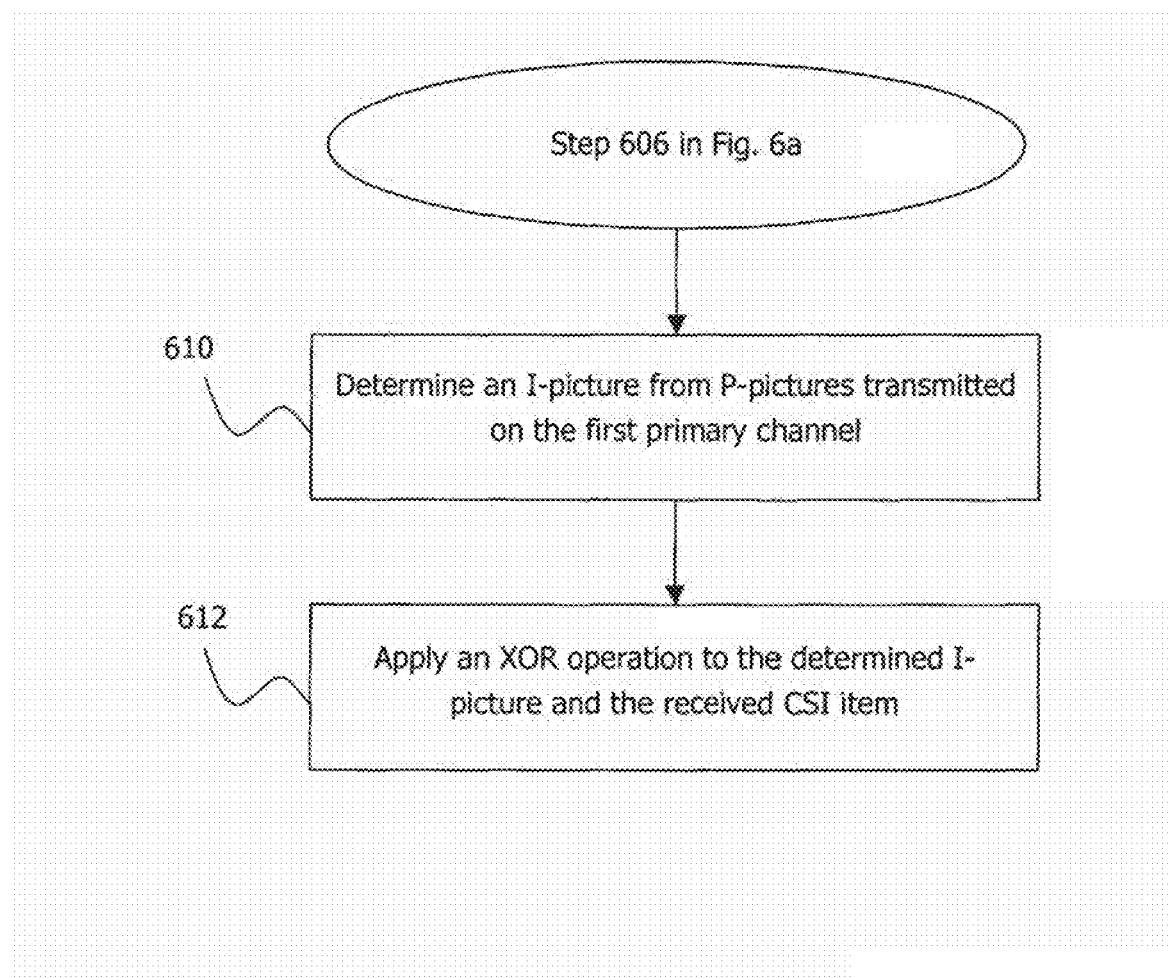

The step 606 of FIG. 6A is now described in more detail with reference to the flow diagram in FIG. 6B. In step 610, the PCR component 502 provides one or more of the pictures received on the first primary channel (i.e. channel A in the example of FIG. 5) to the IPG component 506. The PCR component 502 may buffer previously received P-pictures; this buffering is required in any case for generating images from predictive coding for presentation on the display 504. Therefore the PCR component 502 may provide in response to a channel switching request the buffered P-pictures to the FCS component 110, i.e. IPG component 506.

The IPG component 506 operates to determine an I-picture from the received pictures, which may include (similarly as has been described for the IPG component 204 in the transmitter 102) one of generating an I-picture from one or more received P-pictures and forwarding the I-picture in case an I-picture has been received on the primary channel and forwarded by the PCR component 502 (in case I-pictures of reduced quality are underlying the CSI information, the IPG component 506 has to generate an I-picture of that reduced quality from the I-picture received on the primary channel).

The re-encoding algorithm used in the transmitter and the receiver may be exactly identical (i.e. bit-exact). In other words, the IPG component 506 may use exactly the same re-encoding algorithm for generation of an I-picture from P-pictures as the IPG component 204 in transmitter 102. In this case, it is ensured that the output of the re-encoding operations in step 406 of FIG. 4b and step 610 of FIG. 6b are identical, that is the $I_A$ picture generated by the IPG component 506 is the same as the $I_A$ picture generated in the IPG component 204, which is a prerequisite for generating a useful picture $I_B$ on the basis of the CSI item $C_{AB}$.

As a bit-exact algorithm for the re-encoding any intra-only coding scheme may be used (which does not induce the computational burden of motion estimation, as required for predictively coded pictures) which is well-defined such that it can be ensured that it is performed in the same way at the transmitter side and at the receiver side. Any other bit-exact algorithm may also be used, for example standard algorithms being utilized in typical video encoders. Also simplified intra-coding algorithms may be applied in order to reduce the computational complexity particularly on the receiving side, as far as those algorithms are bit-exact. As this may lead to a lower intra-coding efficiency, a required data rate in the secondary channel may increase. An optimal combination of computational complexity versus bandwidth requirement in the secondary channel may individually be configured for each concrete PTM system.

In step 612, the XOR component 510 applies an XOR operation to the I-picture $I_A$ provided by the IPG component 506 and the CSI item $C_{AB}$ and generates in this way an I-picture $I_B$ of the primary channel, i.e. the I-picture $I_B$ as used in the transmitter for generating $C_{AB}$ is reproduced. This result of the fast channel switching as performed in the FSC component 110 in response to the channel switching request of the user is then presented on the display 504.

The channel switching information transmitted in the secondary channel for the three primary channels A, B and C comprises only the two CSI items $C_{AB}$ and $C_{AC}$. These two items are sufficient to generate an I-picture for any pair of primary channels before/after the channel switching request, as is indicated below:

$$A \to B : I_B = I_A \text{ XOR } C_{AB}$$

$$B \to A : I_A = I_B \text{ XOR } C_{AB}$$

$$A \to C : I_C = I_A \text{ XOR } C_{AC}$$

$$C \to A : I_A = I_C \text{ XOR } C_{AC}$$

$$B \to C : I_C = I_B \text{ XOR } C_{AB} \text{ XOR } C_{AC}$$

$$C \to B : I_B = I_C \text{ XOR } C_{AC} \text{ XOR } C_{AB}$$

In general, N−1 CSI items are required for N primary channels. Further, as illustrated in the above table, at most two operations are required in order to generate any particular I-picture. This can generally by achieved by generating CSI items so that one and the same primary channel is always used as one of the pair of primary channels when generating the CSI items. Consider, for example, a system with 6 primary channels A-F. Preferably, the CSI items may be formed as $C_{AB}$, $C_{AC}$, $C_{AD}$, $C_{AE}$ and $C_{AF}$. In principle, also another combination of CSI items such as $C_{AB}$, $C_{BC}$, $C_{CD}$, $C_{DE}$, $C_{EF}$ might be generated, which would also require for the N=6 primary channels only N−1=5 CSI items. However, the generation of an I-picture for the primary channel F from the primary channel A would require 5 XOR operations instead of the maximum of two operations in case of the former example, in which the primary channel A is used to generate all the CSI items (instead of primary channel A, any other of the primary channels B-F could also be used).

The provision of appropriate CSI items in an appropriate order as required to perform the fast channel switching according to the requested channel switch may be controlled by the CIR component 508 or a control component not explicitly shown in FIG. 5.

In the example described here, the CSI items represent the result of applying an XOR operation to two pictures of a pair of primary channels. In other implementations, the CSI items may represent the result of other operations. Generally, a system with N broadcast/multicast (more generally, PTM) channels and one secondary channel for the transmission of channel switching information with an amount of data equivalent to N−1 I-pictures may be understood as a so-called 'systematic erasure code' known in coding theory with a code rate k/n, in which k=N is the number of input symbols of the code (i.e. primary symbols), while n=N+N−1=2N+1 is the number of output symbols of the code, including k primary symbols and n-k secondary symbols. While a CSI item may have the same size as an I-picture of the primary channels (or may have a reduced size as to a reduced image quality provided by the secondary channel), in some implementations the CSI item may have a larger size than the primary channel I-pictures, which may, for example, lead to a reduced operational complexity on a receiving side for recovering the wanted I-picture of the channel to be switched to.

With the techniques proposed herein, the number of CSI items to be transmitted in the secondary channel amounts to N−1 items as compared to N items in a conventional approach. Thus, a fraction of 1/N of the data rate for the secondary channel can be saved, e.g. 33% for three primary channels, 20% for five primary channels, etc. Vice versa, in case a data rate for the secondary channel is kept fixed, the quality of the I-pictures to be recovered from the CSI items can be improved and/or the transmission rate of the CSI items in the secondary channel can be increased in order to further reduce the tune-in time.

Only a limited amount of additional processing is required in the receiver in order to recover the wanted I-picture for the fast channel switching. For example, the operations to be performed can be limited to two operations, e.g. two XOR operations, regardless of the number of primary channels in the system. By choosing an appropriate operation for the generation of the CSI items, the amount of additional processing complexity in (the transmitter and) the receiver can be balanced with the available bandwidth on the secondary channel.

While the current invention has been described in relation to its preferred embodiments, it is to be understood that this description is for illustrative purposes only.

Accordingly, it is intended that the invention be limited only by the scope of the claims appended hereto.

The invention claimed is:

1. A method implemented by a transmitter for supporting fast channel switching in a system comprising multiple point-to-multipoint ("PTM") primary channels, the method comprising:
    transmitting pictures to a receiver on each of the primary channels;
    determining channel switching information ("CSI") items, different CSI items associated with the primary channels in different pairs of primary channels, the CSI item associated with a given pair enabling derivation of an intra-coded picture for one primary channel in that pair using a picture transmitted for the other primary channel in the pair; and
    transmitting the CSI items to the receiver on a secondary channel, to support fast channel switching between the primary channels at the receiver.

2. The method according to claim 1, wherein the transmitted pictures comprise predictively coded pictures, and wherein determining CSI items comprises determining intra-coded pictures for the primary channels from the predictively coded pictures transmitted on those primary channels.

3. The method according to claim 2, wherein determining CSI items further comprises generating the CSI item associated with a given pair by applying an XOR operation to the intra-coded picture determined for one primary channel in that pair and the intra-coded picture determined for the other primary channel in the pair.

4. The method according to claim 1, wherein determining CSI items comprises determining fewer CSI items than the number of possible pairs of primary channels.

5. The method according to claim 4, wherein two or more CSI items respectively determined for two or more pairs of primary channels support fast channel switching between the primary channels in a pair of primary channels for which no CSI item was determined.

6. The method according to claim 1, wherein the system comprises N primary channels, and wherein determining CSI items comprises determining N−1 CSI items and wherein transmitting the CSI items comprises transmitting the CSI items in parallel on the secondary channel.

7. The method according to claim 1, wherein support for fast channel switching to any given primary channel is provided by at most two of the transmitted CSI items.

8. The method according to claim 7, wherein determining CSI items comprises generating all of the CSI items using an intra-coded picture of the same primary channel.

9. The method according to claim 1, wherein transmitting CSI items comprises transmitting CSI items with at least one of
- an item transmission rate which is lower than a picture transmission rate in the primary channels; and
- an item data size which is smaller than an intra-coded picture data size in the primary channels.

10. The method according to claim 1, wherein the system comprises a television (TV) broadcast system and wherein the transmitted pictures represent TV data.

11. A method implemented by a receiver for supporting fast channel switching in a system comprising multiple point-to-multipoint ("PTM") primary channels, the method comprising:
- receiving pictures on a first primary channel and channel switching information ("CSI") items on a secondary channel, different CSI items associated with the primary channels in different pairs of primary channels, the CSI item associated with a given pair enabling derivation of an intra-coded picture for one primary channel in that pair using a picture transmitted for the other primary channel in the pair; and
- determining, in response to a request to switch from the first primary channel to a second primary channel, an intra-coded picture for the second primary channel using a picture transmitted for the first primary channel and one or more of the CSI items.

12. The method according to claim 11, wherein the received pictures comprise predictively coded pictures, and wherein determining the intra-coded picture of the second primary channel comprises determining an intra-coded picture of the first primary channel from a received predictively coded picture of the first primary channel.

13. The method according to claim 12, wherein determining the intra-coded picture of the second primary channel further comprises generating the intra-coded picture of the second primary channel by applying one or more XOR operations to the intra-coded picture of the first primary channel and one or more of the received CSI items.

14. The method according to claim 13, wherein applying one or more XOR operations comprises applying at most two XOR operations to at most two received CSI items.

15. The method according to claim 11, wherein the system comprises a TV broadcast system and the received pictures represent TV data.

16. A computer program product stored on a non-transitory computer readable medium and comprising program code portions that, when executed on one or more computing devices associated with a transmitter, support fast channel switching in a system comprising multiple point-to-multipoint ("PTM") primary channels, the program code portions causing the transmitter to:
- transmit pictures to a receiver on each of the primary channels;
- determine channel switching information ("CSI") items, different CSI items associated with the primary channels in different pairs of primary channels, the CSI item associated with a given pair enabling derivation of an intra-coded picture for one primary channel in that pair using a picture transmitted for the other primary channel in the pair; and
- transmit the CSI items to the receiver on a secondary channel, to support fast channel switching between the primary channels at the receiver.

17. A computer program product stored on a non-transitory computer readable medium and comprising program code portions that, when executed on one or more computing devices associated with a receiver, support fast channel switching in a system comprising multiple point-to-multipoint ("PTM") primary channels, the program code portions causing the receiver to:
- receive pictures on a first primary channel and channel switching information ("CSI") items on a secondary channel, different CSI items associated with the primary channels in different pairs of primary channels, the CSI item associated with a given pair enabling derivation of an intra-coded picture for one primary channel in that pair using a picture transmitted for the other primary channel in the pair; and
- determine, in response to a request to switch from the first primary channel to a second primary channel, an intra-coded picture for the second primary channel using a picture transmitted for the first primary channel and one or more of the CSI items.

18. A transmitter configured to support fast channel switching in a system comprising multiple point-to-multipoint ("PTM") primary channels, the transmitter comprising:
- primary channel transmission circuitry configured to transmit pictures to a receiver on each of the primary channels; and
- channel switching information (CSI) circuitry configured to:
  - determine CSI items, different CSI items associated with the primary channels in different pairs of primary channels, the CSI item associated with a given pair enabling derivation of an intra-coded picture for one primary channel in that pair using a picture transmitted for the other primary channel in the pair; and
  - transmit the CSI items to the receiver on a secondary channel, to support fast channel switching between the primary channels at the receiver.

19. The transmitter according to claim 18, wherein the system comprises N primary channels, and wherein the CSI circuitry is configured to determine N−1 CSI items and to transmit those CSI items in parallel on the secondary channel.

20. A receiver configured for a fast channel switching in a system comprising multiple point-to-multipoint ("PTM") primary channels, the receiver comprising:
- primary channel reception circuitry configured to receive pictures on a first primary channel and channel switching information (CSI) items on a secondary channel, different CSI items associated with the primary channels in different pairs of primary channels, the CSI item associated with a given pair enabling derivation of an intra-coded picture for one primary channel in that pair using a picture transmitted for the other primary channel in the pair; and
- fast channel switching circuitry configured to determine, in response to a request to switch from the first primary channel to a second primary channel, an intra-coded picture for the second primary channel using a picture transmitted for the first primary channel and one or more of the CSI items.

* * * * *

UNITED STATES PATENT AND TRADEMARK OFFICE
CERTIFICATE OF CORRECTION

PATENT NO. : 8,953,511 B2  
APPLICATION NO. : 13/001771  
DATED : February 10, 2015  
INVENTOR(S) : Rusert et al.

It is certified that error appears in the above-identified patent and that said Letters Patent is hereby corrected as shown below:

In the specification

In Column 8, Line 59, delete "Fur" and insert -- For --, therefor.

In Column 10, Line 65, delete "FSC" and insert -- FCS --, therefor.

Signed and Sealed this  
Twenty-eighth Day of June, 2016

Michelle K. Lee  
*Director of the United States Patent and Trademark Office*